July 18, 1933.    M. C. SILVA    1,918,669
ROAD SCRAPER
Filed March 14, 1932
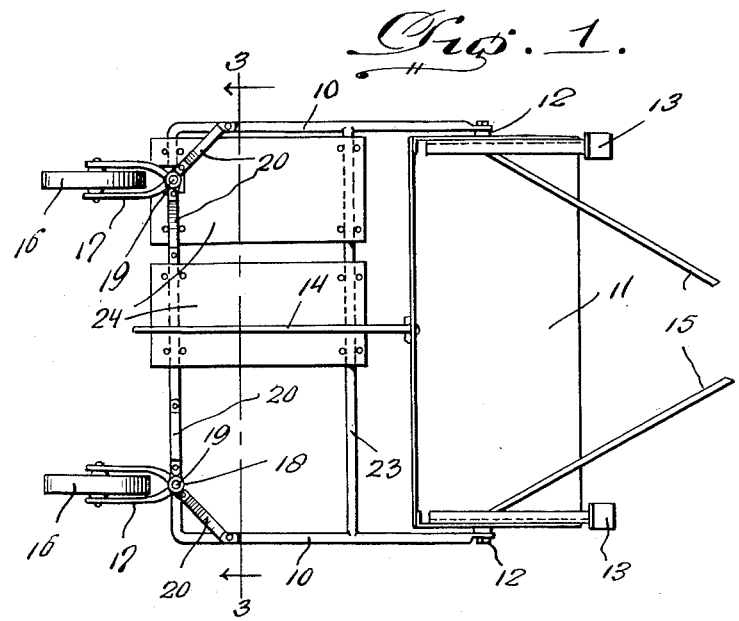
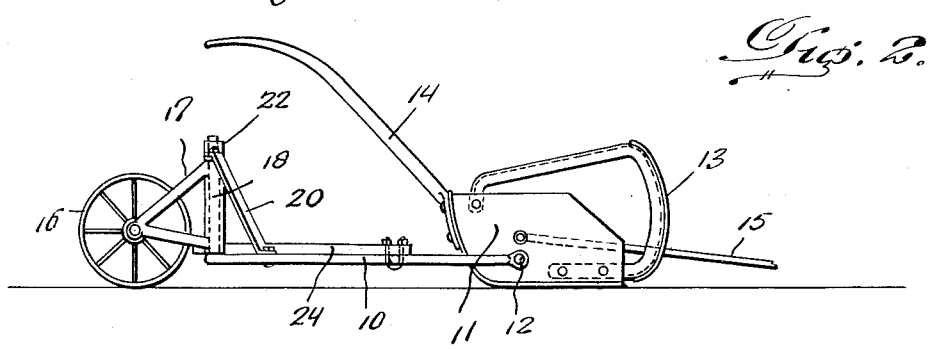
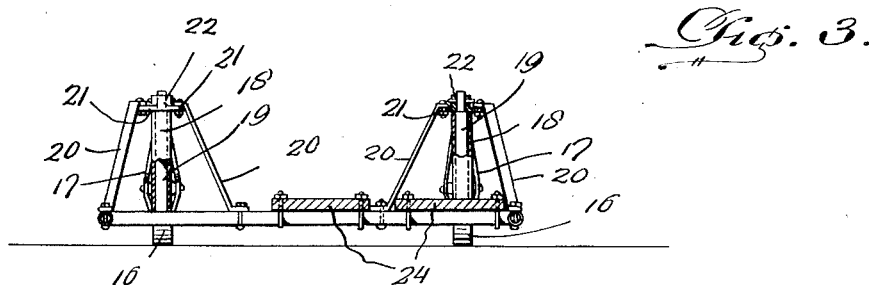
Manuel C. Silva
INVENTOR.
BY J. Stanley Burch
ATTORNEY.

Patented July 18, 1933

1,918,669

UNITED STATES PATENT OFFICE

MANUEL C. SILVA, OF LOS BANOS, CALIFORNIA

ROAD SCRAPER

Application filed March 14, 1932. Serial No. 598,825.

The present invention relates to road scrapers and the like and comprehends a novel construction and arrangement of parts capable of being handled or manipulated with ease and convenience.

In carrying out the invention I provide a frame, at one end of which the scraper is pivotally mounted, while at the opposite end of the frame is arranged a platform from which the operator can easily and conveniently manipulate the scraper.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a plan view.
Figure 2 is a side elevation.
Figure 3 is a section on line 3—3 of Figure 1.

The invention essentially embodies a frame which may vary in size and contour without departing from the inventive idea, but which is preferably U-shaped in plan as illustrated. Positioned between the parallel sides 10 of the frame and at the forward or open end thereof is the scraper 11. The scraper may be of any conventional type, but is pivoted at its opposite ends on the frame as at 12, so that it can be quickly and conveniently inverted from the position it occupies in Figures 1 and 2 as the occasion requires. The scraper is provided with runners 13 upon which it travels in its inverted position, and a handle 14 for manipulating the same. Connected with the scraper are rods 15 forming part of a suitable draft connection (not shown). The scraper reposes upon the road or surface and consequently supports the forward end of the frame in spaced relation thereto, while the opposite end is supported on wheels 16. The wheels are journaled in brackets 17 each of which includes a bearing sleeve 18 for a stub shaft 19 rising from the frame. Each sleeve 18 is braced by brace elements 20 terminally secured to the frame, and to lugs 21 projecting from a collar 22 secured to the upper end of the adjacent shaft 19. One brace element for each sleeve is arranged diagonally across the adjacent corner of the frame as shown.

Connecting the parallel sides of the frame at appropriate points in their length is a transverse rod 23, which not only strengthens the frame but also serves as a platform support. The platform is preferably made up of several planks or boards 24 secured to the transverse rod 23 and the cross members of the frame as shown. Obviously the handle 14 of the scraper projects above the platform and can be conveniently manipulated by a person standing upon the platform. While the structure in its entirety is extremely simple, it is comparatively strong and desirable.

While it is believed that from the foregoing description the nature and advantages of the invention will be readily apparent, I desire to have it understood that I do not limit myself to what is herein shown and described and that such changes may be resorted to when desired as fall within the scope of what is claimed.

What is claimed is:

A road scraper comprising a horizontal substantially U-shaped frame composed of spaced side members rigidly connected at their rear ends by a cross member, a scraper bowl having a rearwardly and upwardly extending handle and arranged between and pivoted at its ends to the free forward ends of the side frame members for free rotation within the frame upon a transverse axis, a transverse rod rigid with and connecting the side members of the frame intermediate their ends, a platform laid across and secured upon the rear cross member of the frame and said transverse rod, stub shafts rigid with and rising from the rear cross member of the frame near but spaced inwardly from the ends of the latter, brackets including sleeves journaled on said stub shafts and members rigid with and projecting rearwardly from said sleeves, ground engaging wheels journaled in the rear ends of said rearwardly projecting bracket members to support the rear end of the frame above the ground, and diagonally arranged inclined braces between the upper ends of said stub shafts and the side members of the frame.

MANUEL C. SILVA.